(12) United States Patent
Dítě et al.

(10) Patent No.: US 11,697,320 B2
(45) Date of Patent: Jul. 11, 2023

(54) TWIST BEAM FOR A SUSPENSION OF A MOTOR VEHICLE

(71) Applicant: THK RHYTHM AUTOMOTIVE GmbH, Duesseldorf (DE)

(72) Inventors: Jan Dítě, Duesseldorf (DE); Miloš Křivan, Duesseldorf (DE); Igor Schlender, Duesseldorf (DE)

(73) Assignee: THK RHYTHM AUTOMOTIVE GmbH, Duesseldorf (DE)

( * ) Notice: Subject to any disclaimer, the term of this patent is extended or adjusted under 35 U.S.C. 154(b) by 0 days.

(21) Appl. No.: 17/451,683

(22) Filed: Oct. 21, 2021

(65) Prior Publication Data

US 2022/0126645 A1  Apr. 28, 2022

(30) Foreign Application Priority Data

Oct. 22, 2020  (DE) ...................... 10 2020 127 863.2

(51) Int. Cl.
*B60G 7/00* (2006.01)
*B60G 17/019* (2006.01)
*B60G 21/05* (2006.01)

(52) U.S. Cl.
CPC ........... *B60G 21/051* (2013.01); *B60G 7/001* (2013.01); *B60G 2200/22* (2013.01)

(58) Field of Classification Search
CPC .. B60G 21/051; B60G 7/001; B60G 2200/22; B60G 17/019; B60G 2204/1162; B60G 2204/143; B60G 2204/148; B60G 2206/10; B60G 2206/7102; B60G 2206/8101; B60G 2206/8104; B60G 2206/8105; B60G 2206/8111; B60G 2206/8201; B60G 2206/8207; B60G 2400/05162; B60G 7/02

See application file for complete search history.

(56) References Cited

U.S. PATENT DOCUMENTS

| | | |
|---|---|---|
| 3,121,348 A | 2/1964 | Reed |
| 4,146,340 A | 3/1979 | Smith, Jr. |
| 4,189,249 A | 2/1980 | Gaines et al. |
| 7,703,782 B2 * | 4/2010 | Kiselis ............... B60G 7/001 280/124.133 |

(Continued)

FOREIGN PATENT DOCUMENTS

| | | | | |
|---|---|---|---|---|
| DE | 10223118 A1 * | 12/2003 | ............. | B60G 7/001 |
| DE | 102011116298 A1 * | 4/2012 | ............. | B60G 7/001 |

(Continued)

OTHER PUBLICATIONS

Description Translation for DE 10223118 from Espacenet (Year: 2007).*

(Continued)

*Primary Examiner* — James M Dolak
*Assistant Examiner* — Daniel M. Keck
(74) *Attorney, Agent, or Firm* — McNees Wallace & Nurick LLC

(57) ABSTRACT

A twist beam for a suspension of a motor vehicle comprises a body-side inner part having a bearing-receiving section for receiving a body-side bearing, and a wheel carrier-side outer part having a bearing-receiving section for receiving a wheel carrier-side bearing, the outer part and the inner part being separate components which are made of different materials and are firmly connected to each other.

20 Claims, 4 Drawing Sheets

(56) References Cited

U.S. PATENT DOCUMENTS

| | | | | |
|---|---|---|---|---|
| 8,496,258 B2* | 7/2013 | Werner | ................ | B60G 7/001 |
| | | | | 280/124.128 |
| 10,589,588 B2* | 3/2020 | Souschek | ............... | B60G 7/008 |
| 11,135,885 B2* | 10/2021 | Meyer | .................... | B23P 15/00 |
| 2005/0044984 A1 | 3/2005 | Jones | | |
| 2018/0326803 A1 | 11/2018 | Meyer et al. | | |
| 2020/0122537 A1* | 4/2020 | Schmidt | ................. | B60G 7/001 |

FOREIGN PATENT DOCUMENTS

| | | |
|---|---|---|
| DE | 10 2013 225 334 A | 6/2015 |
| DE | 10 2017 107 463 B3 | 5/2018 |
| DE | 10 2018 209 269 B3 | 9/2019 |
| EP | 1329343 A2 | 7/2003 |
| JP | H11-217014 A1 | 8/1998 |

OTHER PUBLICATIONS

Description Translation for DE 102017/107463 from Espacenet (Year: 2018).*
Description Translation for DE 102017107463 from Espacenet (Year: 2017).*

* cited by examiner

TWIST BEAM FOR A SUSPENSION OF A MOTOR VEHICLE

FIELD OF THE INVENTION

The invention relates to a twist beam for a suspension of a motor vehicle.

BACKGROUND OF THE INVENTION

Twist beams for a suspension of a motor vehicle are, for example, transverse or longitudinal links which serve to connect a wheel carrier to the vehicle body. In view of the necessary mobility when the wheel carrier compresses and rebounds, joints are usually provided both between the body and the body-side end of the link and between the wheel carrier and the wheel carrier-side end of the link, for example elastomer joints or ball joints.

The object of the invention is to create a link which is characterized by a very good strength to component weight ratio.

SUMMARY OF THE INVENTION

According to the invention, a twist beam for a suspension of a motor vehicle is provided for this purpose, comprising a body-side inner part having a bearing-receiving section for receiving a body-side bearing, and a wheel carrier-side outer part having a bearing-receiving section for receiving a wheel carrier-side bearing, the outer part and the inner part being separate components which are made of different materials and are firmly connected to each other. The invention is based on the basic idea of adapting the materials for the inner part and the outer part to the respectively acting loads. This results in a generally very low weight for the twist beam, while at the same time achieving a very high strength. A further advantage of the twist beam according to the invention is the modularity, as different inner parts and outer parts can be combined with each other depending on specific requirements, for example to adapt the twist beam to different wheelbases of different vehicle types. Furthermore, the bearing-receiving sections can be aligned differently relative to each other when the inner part is connected to the outer part, so that it is possible to use the twist beam on both the right-hand side of the vehicle and the left-hand side while the design is identical per se.

According to one embodiment of the invention, it is provided that the bearing-receiving section of the inner part has a cylindrical inner contour. This makes it possible to press the body-side bearing into the bearing-receiving section.

According to one configuration of the invention, the inner part is an extruded profile part, in particular made of an aluminum alloy. This makes it possible to achieve complicated geometries for the inner part at low manufacturing costs, allowing high strength values to be realized.

The inner part preferably has a machined connecting section for connection to the outer part. Machining allows the manufacture, with little effort, of connection geometries which cannot be represented in an extruded profile part as such, for example a sleeve-shaped receptacle for a connecting section of the outer part.

According to one embodiment of the invention, a linking formation is provided on the inner part for coupling with an angle sensor. The position of the twist beam can be precisely obtained with the angle sensor. The linking formation can already be provided during the manufacture of the inner part, resulting in generally low manufacturing costs.

According to one configuration, it is provided that the linking formation is an extruded opening into which a linking pin is inserted. The latter can be pressed in or screwed in, for example. In any case, no further processing steps are required to obtain the linking formation.

According to an alternative configuration, it is provided that the inner part has a bent sheet metal part. With a bent sheet metal part, comparatively stiff components can be produced at low manufacturing costs, so that the desired high strength of the twist beam is obtained.

In accordance with one configuration of the invention, it is provided that the inner part comprises a single sheet metal blank having two deep-drawn areas which together form the bearing-receiving section, and a weld seam. In this configuration, no steps of assembling two components to each other are required to obtain the inner part. Instead, the necessary geometry for receiving the body-side bearing can be obtained by deep-drawn sections of the sheet metal blank.

Preferably, the inner part is composed of a single sheet metal blank which is formed into the required shape by several deep-drawing and/or bending operations and constitutes the bearing-receiving section. Furthermore, in the case of deep-drawing materials where extrusion for pressing in and supporting the body-side bearing cannot be realized, a tubular blank can be considered for this function. This blank can be coupled to the deep-drawn product via weld seams, for example. In the former embodiment, no steps of assembling two components to each other are required to obtain the inner part.

According to an alternative configuration, it is then provided that the inner part has a body which is firmly connected to a ring which forms the bearing-receiving section. This configuration makes it possible to make the prefabricated product for the body less complex. The bearing-receiving section is formed by the separately configured ring, which is then connected, for example welded to the body.

The body can be configured as a plastically deformed tube, so that a circumferentially closed body is already used, which has a correspondingly high strength.

Alternatively, the body may be a bent sheet metal part manufactured from a suitable blank.

The inner part may have a closed cross-section to provide increased torsional strength. In this case, the opposite edges of the sheet metal blank are welded together.

It may also be possible that the inner part has a C-shaped cross-section, resulting in a generally lower weight.

The inner part and the outer part may in principle be connected to each other in any suitable manner, in particular by an intermaterial bond and/or in a form-fitting manner. For example, the two parts may be glued, soldered, welded, riveted, pressed or crimped together. Combinations of these types of connections are also possible. For example, one of the components may be provided with projections or other reliefs which dig into the material of the other component upon pressing or crimping. It is also possible that one of the two components is provided with projections which mechanically engage openings in the other component, and that an additional press-fit or crimped connection is provided.

According to one configuration of the invention, the inner part has a crimp sleeve into which the outer part is inserted. Such a sleeve makes it possible to precisely adjust the distance between the centers of the two bearing-receiving sections before the inner part is connected to the outer part.

Furthermore, it is possible to adjust the alignment of the two bearing-receiving sections by rotating the inner part relative to the outer part before the two parts are firmly connected to each other.

The outer part is preferably made of metal, while sheet metals are suitable for the inner part, but also plastic materials, fiber composites, etc.

The outer part is preferably configured as a forged part, so that a very high component strength is achieved.

The outer part may also be manufactured as a cast part or by cold forming.

Preferably, the outer part has a machined connecting section for linkage to the inner part, so that a high precision is obtained.

The above-mentioned object is also achieved by an assembly of two twist beams of the aforementioned type, the orientation of the body-side bearing-receiving section of one twist beam relative to the wheel carrier-side bearing-receiving section thereof being mirror-inverted to the orientation of the body-side bearing-receiving section of the other twist beam relative to the wheel carrier-side bearing-receiving section thereof. The mirror-inverted orientations can be produced with little effort by twisting the outer parts relative to the inner parts in the desired direction before the two components are firmly connected to each other. In this way, both a right-hand twist beam and a left-hand twist beam can be obtained with components which are identical per se.

BRIEF DESCRIPTION OF THE DRAWINGS

The invention is described below with reference to various embodiments which are illustrated in the accompanying drawings and in which.

DETAILED DESCRIPTION OF THE INVENTION

Figure 1:
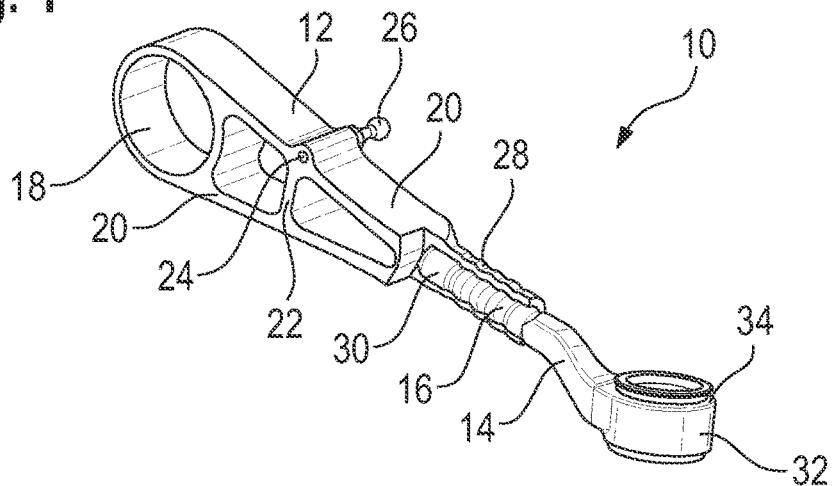
FIG. 1 shows a twist beam according to a first embodiment in a perspective, partially cut view.

FIG. 1 shows a twist beam 10 which is a suspension link for a suspension of a motor vehicle.

The twist beam 10 has an inner part 12 which is the body-side section of the twist beam, that is, the part intended to be connected to the vehicle body.

The twist beam 10 further includes an outer part 14, that is, the part intended to be connected to the wheel carrier.

The two parts 12, 14 are firmly connected to each other in a connecting section 16.

The inner part 12 has a bearing-receiving section 18, which is intended to receive a body-side bearing. Here, the bearing-receiving section 18 has a cylindrical inner contour.

In the example embodiment shown, the inner part 12 is manufactured from an extruded profile by cutting off sections with the desired width. This makes it possible to achieve a comparatively complex, load-adapted geometry with comparatively little manufacturing effort. In the example embodiment shown, the circular-cylindrical bearing-receiving section 18 can be obtained in one piece with external "bands" 20 and a stiffening web 22.

A linking formation 24 for a linking pin 26 is also provided as part of the extruded profiled part. Here, the linking formation 24 is configured as an opening which is continuous in the transverse direction. The linking pin 26 is used to connect to an angle sensor by means of which the position of the twist beam 10 relative to the vehicle body can be sensed.

The linking pin 26 can be simply pressed into the linking formation 24 with a press fit, or it may be provided with a self-tapping thread so that it can be firmly anchored there with little effort.

On the side of the inner part 12, the connecting section 16 consists of a sleeve 28 produced by machining the profiled part. The central axis of the sleeve thus produced extends along the longitudinal axis of the inner part 12. For example, the sleeve may be drilled.

A spigot-like end 30 of the outer part 14 is received in the sleeve 28. The end 30 is provided with a plurality of ribs, grooves, slots or similar formations on its outer surface to provide a reliable connection to the inner part 12.

At the other end, the outer part 14 has a wheel carrier-side bearing-receiving section 32 which here is also configured to be annular with a circular cylindrical inner contour.

In addition, a circumferential groove 34 for fastening a sealing bellows is formed integrally with the bearing-receiving section 32.

The outer part 14 is configured here as a forged part made of a suitable metal alloy.

The inner part 12 and the outer part 14 are connected to each other by inserting the end 30 of the outer part 14 into the sleeve 28 of the inner part 12, and then by inwardly pressing or crimping the sleeve 28 from the outside. A form-fitting connection between the sleeve 28 of the inner part and the end 30 of the outer part is thus achieved.

Before the two parts are pressed together, fine adjustment of the distance between the central axes of the bearing-receiving sections 18, 32 can be made by pushing the end 30 more or less far into the sleeve 28. Further, the central axes of the two bearing-receiving sections 18, 32 can be adjusted relative to each other in the desired manner. In the embodiment shown, the two central axes (in a projection along the longitudinal axis of the twist beam 10) are approximately perpendicular to each other.

Figure 2:
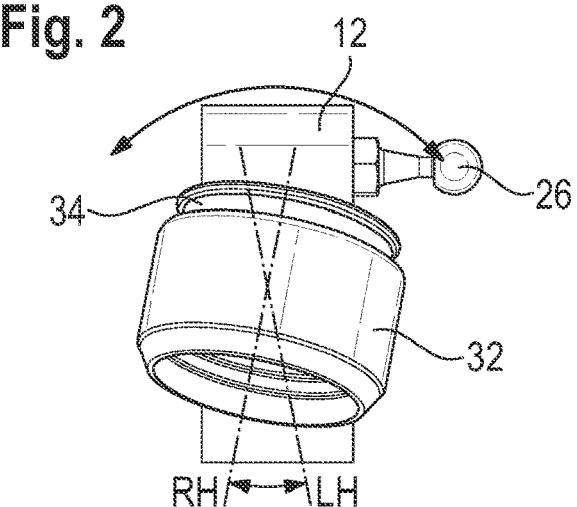
FIG. 2 shows a front view of the twist beam of FIG. 1.

As can be seen in detail in FIG. 2, the alignment of the central axes relative to each other can also be selected so that, by simply rotating the outer part 14 slightly relative to the inner part 12, either a right-side twist beam 10 or a left-side twist beam 10 is obtained, i.e., a twist beam that is used on the right side of the suspension or on the left side. In FIG. 2, the wheel carrier-side bearing part 32 is shown in the orientation for the right-side arrangement (with the central axis RH), while dashed lines also show the central axis LH for the left-side twist beam. A manufacturing cost advantage is thus obtained, as the same inner part 12 and outer part 14 can be used to produce the different twist beams for opposite sides of the suspension.

Figure 3:
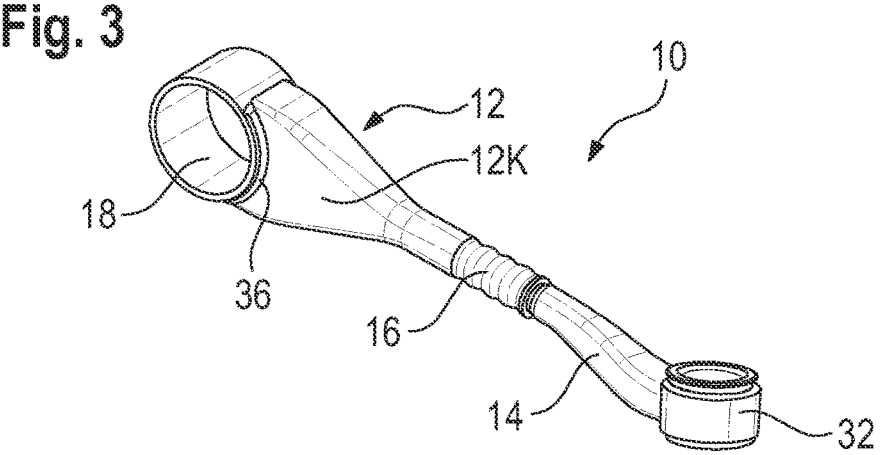
FIG. 3 shows a twist beam according to a second embodiment in a perspective view.

FIG. 3 shows a twist beam 10 according to a second embodiment. The same reference signs are used for the components known from the first embodiment, and in this respect, reference is made to the above explanations.

The essential difference between the first and the second embodiment is that in the second embodiment, the inner part 12 of the twist beam 10 is manufactured from two components which are firmly connected to each other.

The inner part 12 has a body 12K, which in this case is made of sheet metal. A ring, for example a tubular section, which forms the body-side bearing-receiving section 18 is connected thereto. The two components are here connected to each other by means of a weld seam 36.

The body 12K may be a deep-drawn, bent and suitably welded bent sheet metal part. It is also possible that the body 12K is manufactured from a tubular section which is suitably deformed, for example expanded by means of a hydroforming process at the end to which the bearing-receiving section 18 is attached.

The ring forming the bearing-receiving section 18 may also be made of sheet metal.

In this embodiment, the inner part 12 and the outer part 14 are also pressed together by means of the connecting section 16.

Figure 4:
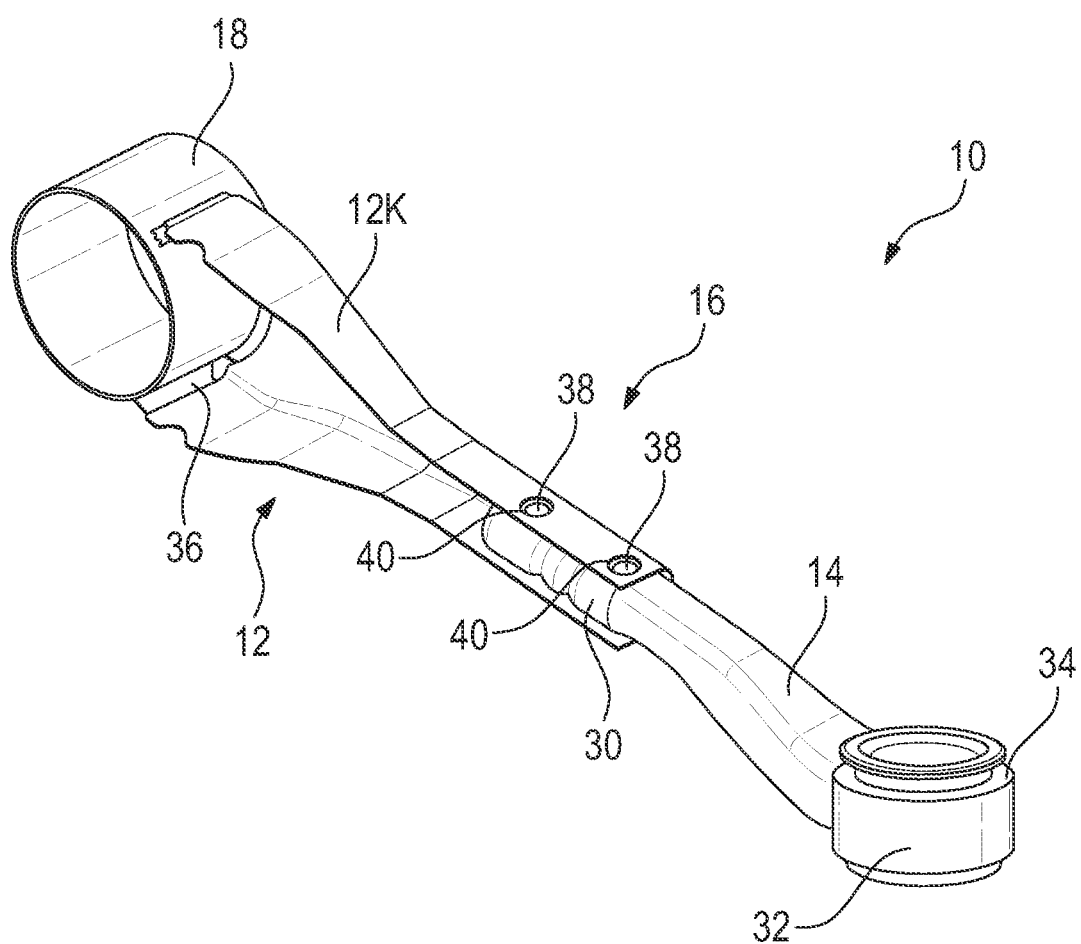
FIG. 4 shows a twist beam according to a third embodiment in a perspective view.

FIG. 4 shows a third embodiment of the twist beam 10. The same reference signs are used for the components known from the previous embodiments, and in this respect, reference is made to the above explanations.

The difference between the third and the second embodiment is that the body 12K of the inner part 12 is not configured as a profile closed in the circumferential direction, but is C-shaped. With regard to the basic design, in which the body 12K is configured as a bent sheet metal part which is connected to the ring forming the bearing-receiving section 18 by means of a weld seam 36, the third and the second embodiment correspond to each other.

A further difference between the third and the second embodiments relates to the connecting section 16.

Here, the end 30 of the outer part 14 facing away from the bearing-receiving section 32 is provided with a total of four projections 38 which engage in suitably dimensioned openings 40 formed in the connecting section of the body 12K.

The body 12K is wrapped around the end 30 of the outer part 14 in the connecting section 16 and suitably pressed against it, so that a mechanically reliable connection is obtained which is supported by the form fit between the projections 38 and the openings 40.

Figure 5:
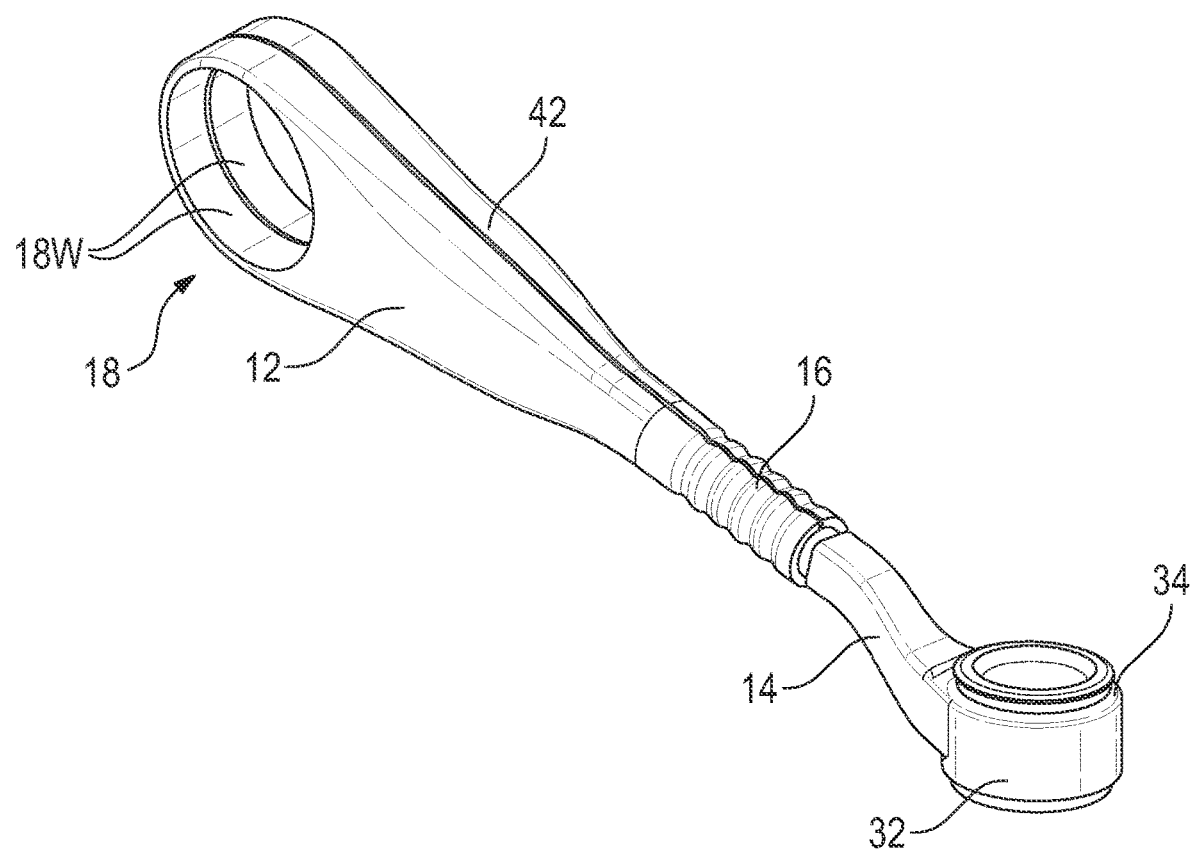
FIG. 5 shows a twist beam according to a fourth embodiment in a perspective view.

FIG. 5 shows a fourth embodiment. The same reference signs are used for the components known from the previous embodiments, and in this respect, reference is made to the above explanations.

In the fourth embodiment, the inner part 12 is manufactured from a single sheet metal blank suitably deep-drawn to form the inner wall 18W of the bearing-receiving section 18. The sheet metal blank is suitably bent and then closed by means of a longitudinally extending weld seam 42.

The connecting section 16 is also used in the fourth embodiment, which here is configured as a crimping or pressing section.

As an alternative to crimping or pressing, it may also be provided that the two parts 12, 14 are soldered or glued together. It is also conceivable to use a welded connection.

In contrast to the configurations discussed here, in which the inner part 12 is made of sheet metal, it is also conceivable in principle to use plastic or fiber composites. Since these cannot be plastically deformed, the connecting section 16 must then be designed in a different way, for example as an adhesive connection.

Figure 6:
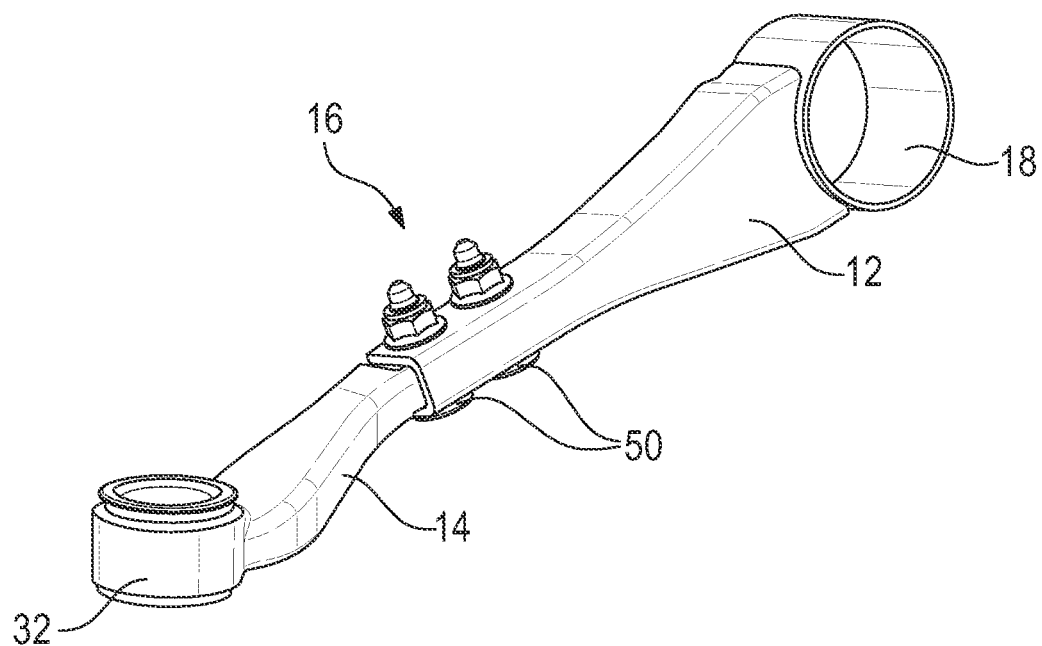
FIG. 6 shows a twist beam according to a fifth embodiment in a perspective view.
Figure 7:
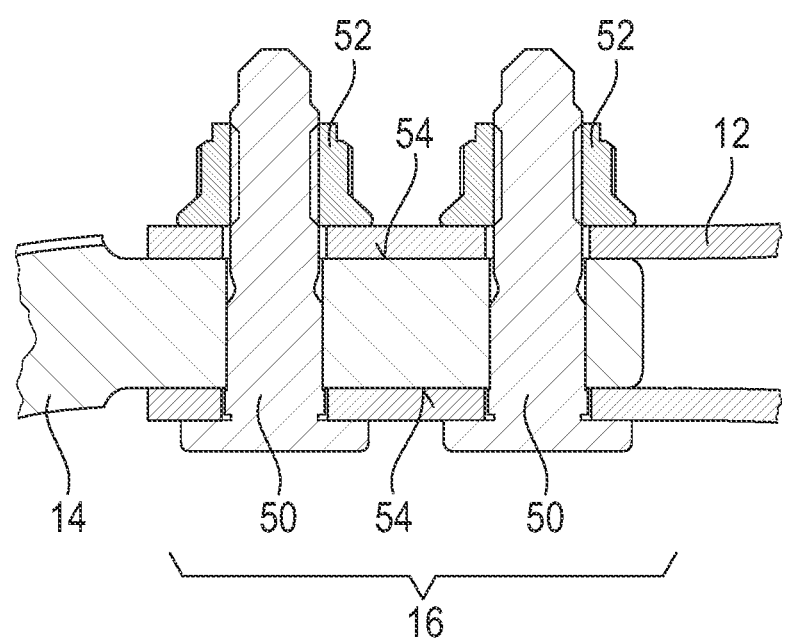
FIG. 7 shows a section through a connecting section of the twist beam of FIG. 6.

FIGS. 6 and 7 show a fifth embodiment. The same reference signs are used for the components known from the previous embodiments, and in this respect, reference is made to the above explanations.

The fifth embodiment is based on the third embodiment, but differs therefrom with respect to the connecting section 16.

In the fifth embodiment, the inner part 12 and the outer part 14 are connected to each other by a screw connection.

In the example embodiment shown, two screw bolts 50 are used which extend in the connecting section 16 through the two sheet metal layers of the inner part 12 and through the outer part 14 and onto each of which a nut 52 is screwed. In this way, the outer part 14 is firmly clamped in the inner part 12.

To improve the mechanical connection between the inner part 12 and the outer part 14, two parallel wrench faces 54 are introduced (e.g. milled) into the shank of the outer part 14, which serve as contact surfaces for the sheet metal part of the inner part 12. Twist beams for the left and the right side can also be produced here due to different milling operations. Different lengths of the twist beam can be created by shifting the holes of the screws 50 (in the inner part 12 and/or in the outer part 14).

The invention claimed is:

1. A twist beam for a suspension of a motor vehicle, comprising:
    a body-side inner part having a bearing-receiving section for receiving a body-side bearing, and
    a wheel carrier-side outer part having a bearing-receiving section for receiving a wheel carrier-side bearing,
    wherein the outer part and the inner part are separate components which are made of different materials and are firmly connected to each other,
    wherein the inner part is an extruded profiled part that has a machined connecting section for connection to the outer part,
    wherein the connection section consists of a sleeve,
    wherein the outer part has a spigot-like end that is received in the sleeve, and
    wherein the spigot-like end is provided with a plurality of ribs, grooves or slots.

2. The twist beam of claim 1, wherein the bearing-receiving section of the inner part has a cylindrical inner contour.

3. The twist beam of claim 1, wherein the inner part is of an aluminum alloy.

4. The twist beam of claim 1, wherein a linking formation which is configured to couple with an angle sensor is provided on the inner part.

5. The twist beam of claim 4, wherein the linking formation is an extruded opening into which a linking pin is inserted.

6. The twist beam of claim 1, wherein the inner part includes a bent sheet metal part.

7. The twist beam of claim 6, wherein the inner part is composed of a single sheet metal blank having two deep-drawn regions which together form the bearing-receiving section, and a weld seam.

8. The twist beam of claim 1, wherein the inner part includes a body which is firmly connected to a ring which forms the bearing-receiving section.

9. The twist beam of claim 8, wherein the body is a plastically deformed tube.

10. The twist beam of claim 9, wherein the body is a bent sheet metal part.

11. The twist beam of claim 10, wherein the inner part has a closed cross-section.

12. The twist beam of claim 10, wherein the inner part has a C-shaped cross-section.

13. The twist beam of claim 1, wherein the inner part and the outer part are connected to each other by an inter-material bond.

14. The twist beam of claim 1, wherein the inner part and the outer part are connected to each other in a form-fitting manner.

15. The twist beam of claim 1, wherein the inner part has a crimp sleeve into which the outer part is inserted.

16. The twist beam of claim 1, wherein projections are provided on the inner part or on the outer part and are received in openings in the other of the inner part or the outer part.

17. The twist beam of claim 1, wherein the outer part is a forged part.

18. The twist beam of claim 1, wherein the outer part has a machined connecting section for linkage to the inner part.

19. An assembly of two twist beams as defined in claim 1, wherein an orientation of the body-side bearing-receiving section of one twist beam relative to the wheel carrier-side bearing-receiving section thereof is mirror-inverted to an orientation of the body-side bearing-receiving section of the other twist beam relative to the wheel carrier-side bearing-receiving section thereof.

20. A twist beam for a suspension of a motor vehicle, comprising:
- a body-side inner part having a bearing-receiving section for receiving a body-side bearing, and
- a wheel carrier-side outer part having a bearing-receiving section for receiving a wheel carrier-side bearing,
- wherein the outer part and the inner part are separate components which are made of different materials and are firmly connected to each other,
- wherein the inner part includes a body which is firmly connected to a ring which forms the bearing-receiving section, and
- wherein the body is a plastically deformed tube,
- wherein the inner part has a connection section that includes a sleeve, and
- wherein the inner part and the outer part are connected to each other by inserting an end of the outer part into the sleeve of the inner part and the sleeve is pressed or crimped inwardly from the outside.

* * * * *